March 9, 1954 — KARL-HUGO LARSSON — 2,671,288
TRAWL NET
Filed Dec. 12, 1949 — 4 Sheets-Sheet 2
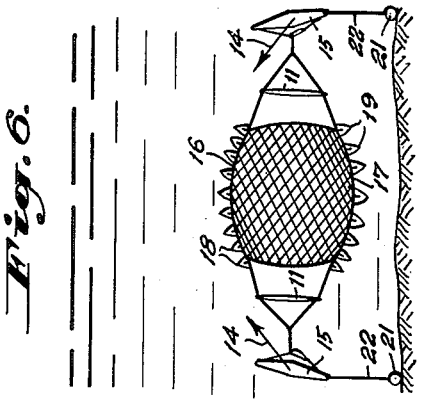
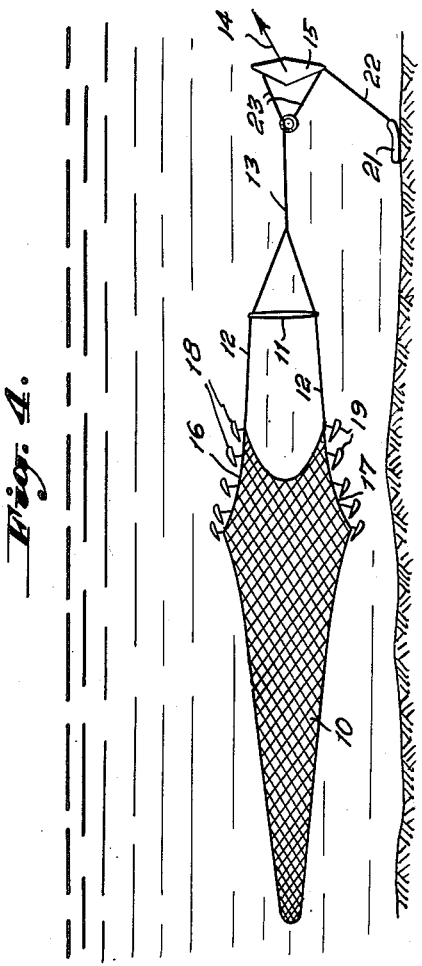
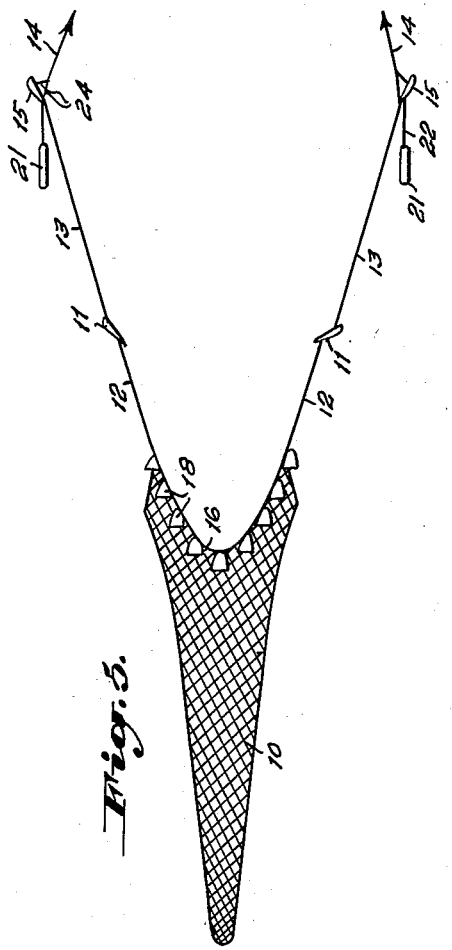
INVENTOR.
Karl-Hugo Larsson
BY Henry C. Parker
Attorneys.

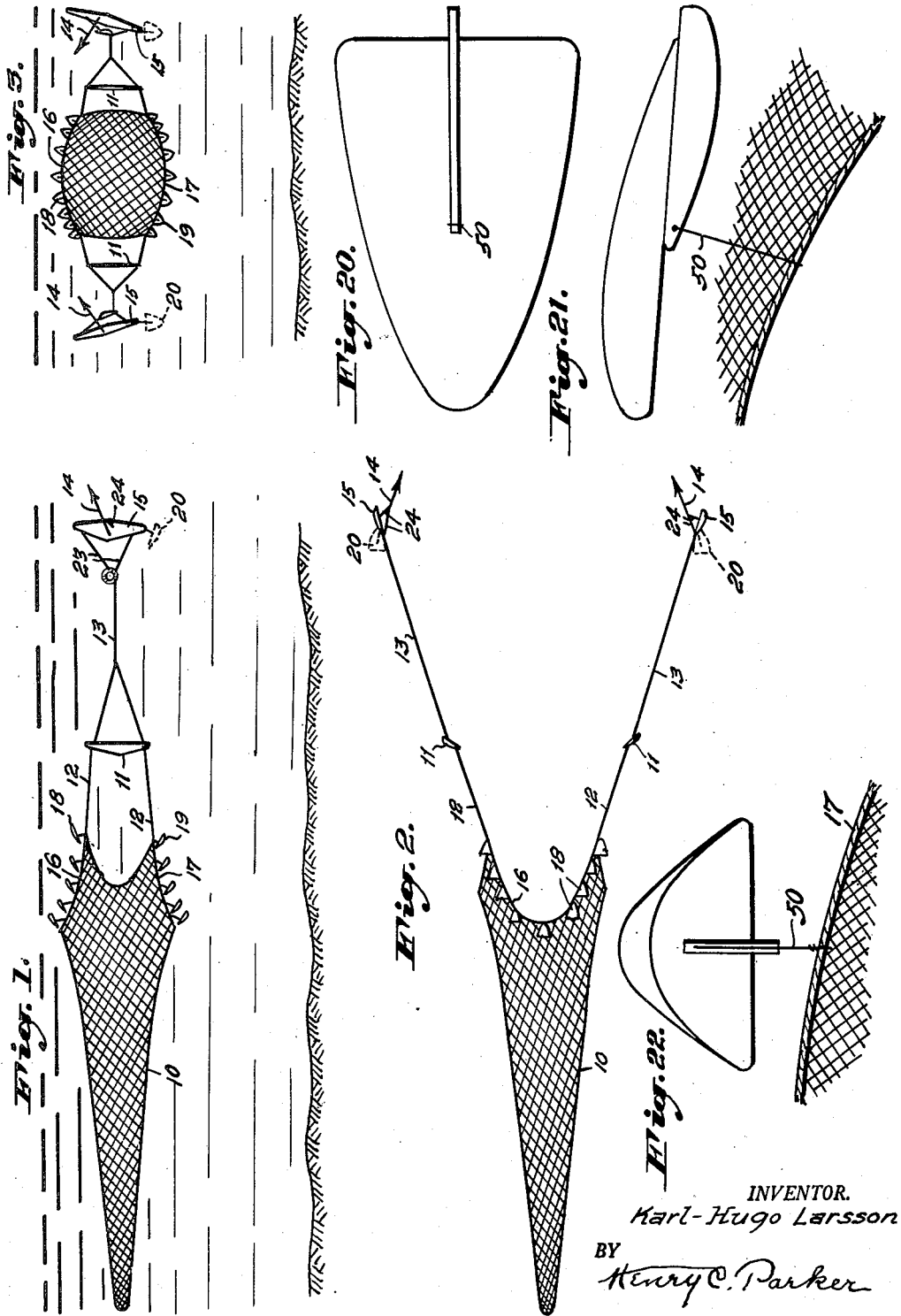

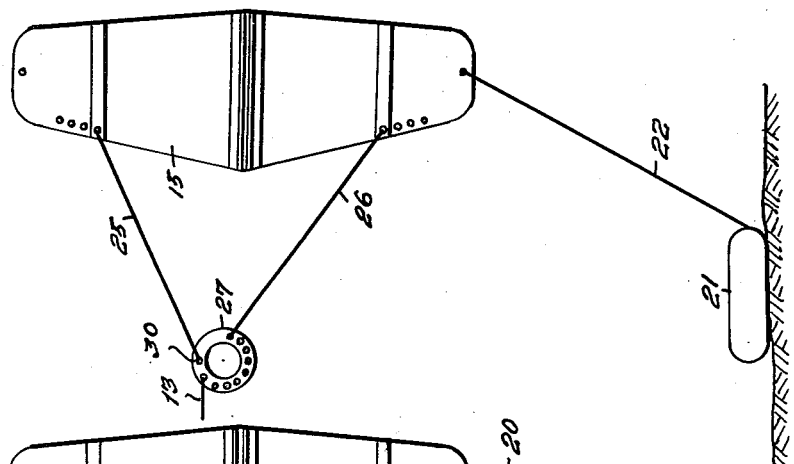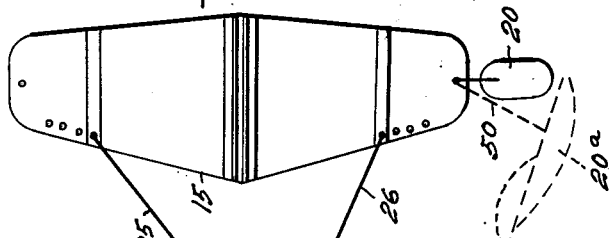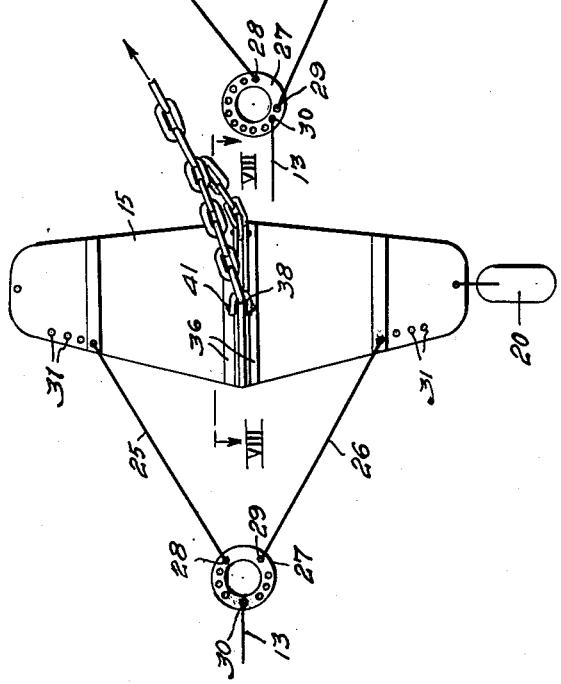

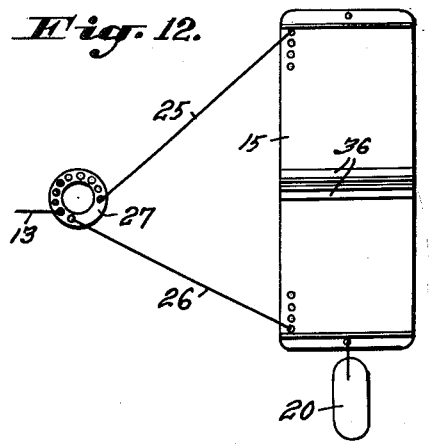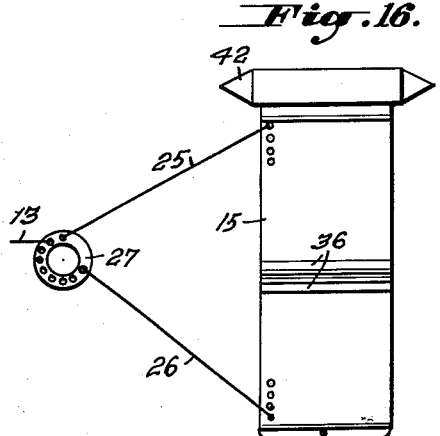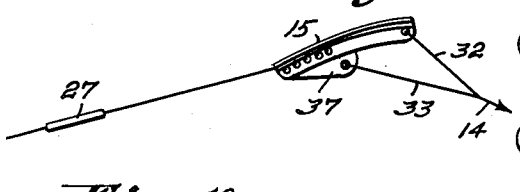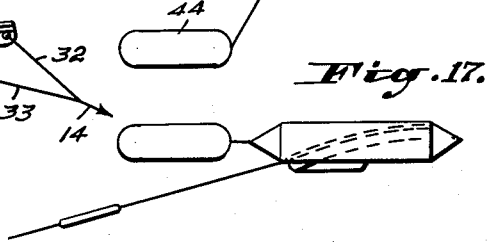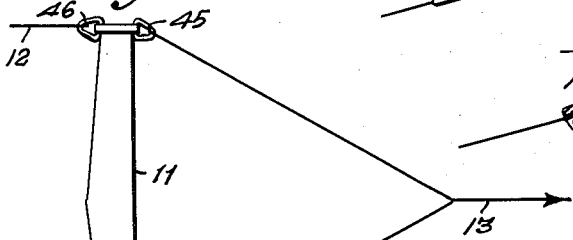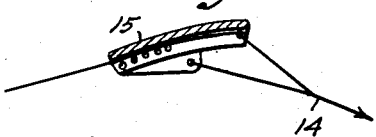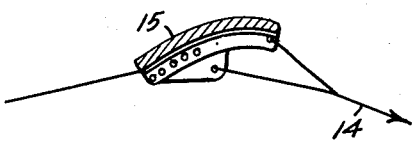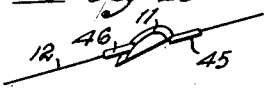

Patented Mar. 9, 1954

2,671,288

UNITED STATES PATENT OFFICE 2,671,288

TRAWL NET

Karl-Hugo Larsson, Stockholm, Sweden

Application December 12, 1949, Serial No. 132,461

7 Claims. (Cl. 43—9)

Fishing with an ordinary trawl net, which is dragged along the bottom of the sea, can only be carried out where the bottom is even and more or less free from stones, since the trawl net is easily damaged by an uneven bottom. Certain kinds of fish are, however, most abundant near a so-called rock bottom, i. e. a bottom where fishing with an ordinary trawl net is impossible. Additionally, these fish cannot, at least where greater depths are concerned, be effectively caught with other hitherto known methods of fishing with net-like tackle.

Certain kinds of fish, for instance herring and mackerel, which occur in shoals, often stand near the surface of the water or in any case so high above the bottom of the sea that they cannot always be caught by means of a trawl net which is dragged along the bottom. Fish which stand near the water surface have hitherto generally been caught by means of drift nets or purse-seines, but both of these methods require expensive implements which are easily damaged, and can only be practiced in comparatively fine weather. Fish which stand too deep under the surface to be caught with drift nets or purse-seines and too high above the bottom to be caught with an ordinary trawl-net, have not hitherto been reachable with known effective catching equipment.

It has therefore long been desired to provide a trawl net which floats freely in the water, a so-called floating trawl net, i. e. a trawl-net-like article which may be moved through the water at a certain predetermined depth under the surface of the water or at a certain predetermined height above the bottom of the sea. Various proposals for floating trawl nets have also been made, in which the depth of the trawl net is regulated from towed floats or similar devices. In most cases it has then been necessary to use two boats for towing the trawl net, but this has involved considerable inconveniences, since it is very difficult to carry through a satisfactory co-operation between two boats at night and during unfavourable weather conditions. According to certain other proposals a floating trawl net has been provided equipped with floating trawl doors which keep the sweeping cables apart so that the floating trawl net, similarly to ordinary trawl nets, can be towed by a single boat, but the floating trawl nets thus proposed have had practical defects and have not therefore found any appreciable use. In the first instance, it has in the previously proposed single boat floating trawl nets been difficult to keep the mouth of the trawl net sufficiently open, particularly in the vertical direction.

The present invention has for its object to eliminate the drawbacks met with in the previously proposed single-boat floating trawl nets and to provide a single-boat floating trawl net of an improved and simplified construction. It is an important feature of the single-boat floating trawl net provided according to the invention that the members for keeping the mouth of the trawl net open consist of two floating trawl doors, which are inserted in the towing cables so as to have a lateral shearing effect, and of a number of self-stabilizing shearing boards which are attached to the head-rope and to the foot-rope respectively and insure that the mouth of the trawl net is given greater height than in previously known floating trawl nets and maintains substantially its shape despite changes in the towing speed.

Other features and advantages of the single-boat floating trawl net according to the invention will appear from the following detailed description of a number of embodiments with reference to the attached drawings. In these:

Figure 1 is a side-view, Figure 2 a top view and Figure 3 a front view of a single-boat type floating trawl net according to the invention towed at a certain depth below the surface of the water.

Figures 4, 5 and 6 are similar views of a trawl net, the towing depth of which is regulated from the bottom of the sea.

Figure 7 gives, on a larger scale, a side view of a floating trawl door, Figure 8 a cross section on the line VIII—VIII in Figure 7, and Figure 9 a detail.

Figure 10 shows the trawl door according to Figure 7 connected up in such a manner as to obtain a downwardly directed shearing effect, and Figure 11 the same trawl door connected up so as to obtain an upwardly directed shearing effect.

Figure 12 shows a trawl door of a modified shape provided with a detachable ballast weight.

Figure 13 shows the profile of the trawl door according to Figure 12 when made of iron with a constant radius of curvature of the pressure surface, and Figure 14 the corresponding profile for a trawl door of wood.

Figure 15 shows a profile having a varying radius of curvature.

Figure 16 shows a trawl door similar to the trawl door according to Figure 12 but provided with a float and a dragging weight, and Figure 17 a top view of the trawl door according to Figure 16.

Figures 18 and 19 show in side view and top view a wooden shoulder rod having a shearing effect of its own.

Fig. 20 is a bottom view on a larger scale of one of the self-stabilizing shearing boards which are attached to the head and foot ropes of my trawling net, Fig. 21 is a side view of the shearing board showing its mode of attachment to the head rope, while Fig. 22 is a front view of the shearing board attached to the head rope.

In Figures 1 to 3 the reference numeral 10 designates the trawl net proper, 11 the shoulder rods, 12 the wires connecting the ends of the shoulder rods to the arms of the trawl net, 13 the sweeping cables and 14 the trawl net warp. The trawl net warp 14 and the sweeping cables 13 form together the towing cables of the trawl net. The trawl doors 15, which consist of boards having a greater height than width and provided at their lower edge with a ballast, are so inserted in the towing cables between the trawl net warp 14 and the sweeping cables 13 that, when moving through the water, these diverge in the direction of movement, thereby forcing the sweeping cables 13 apart so that the mouth of the trawl net is opened laterally, and also diverge in the direction upwards, whereby the trawl net is pulled down to a predetermined depth below the water surface.

To counteract the tendency of the trawl doors 15 to pull together the mouth of the trawl net in a vertical direction, there are provided on the head-rope 16 and the foot-rope 17 a number of self-stabilizing shearing boards 18 and 19, connected to the head rope and foot rope, respectively, by a single cord 50, as shown best in Figs. 20–22, the shearing forces of which are directed upwardly and downwardly respectively. By suitably setting the trawl doors 15 and by selection of a suitable number of self-stabilizing shearing boards 18 and 19 on the head-rope and on the foot-rope, the mouth of the trawl net can be kept well open in a vertical direction, as seen in Figs. 3 and 6, even when the trawl net is towed at a comparatively great speed. This is of the greatest importance, e. g. when fishing for herring, because the herrings when frightened generally try to escape downwardly in the water.

Measurements carried out during actual operation have shown that a floating trawl net having a square mouth of the dimensions 8 by 8 metres has a maximum height of mouth opening of about 13 metres and a maximum width of about 10 metres.

To cause the trawl net to go down to a great depth while using short towing cables 14, 13, it is suitable to apply at the lower edge of each trawl door 15 extra weights or other means, by way of example an extra ballast weight 20 or a self-stabilizing shearing board 20a (Fig. 10) which, in operation, automatically takes up a suitable shearing position and pulls down the trawl door. As shown in Fig. 10 in dotted lines and in full lines in the other figures of the drawing, the self-stabilizing shearing boards here employed are provided with a stream-lined convex rear or section surface while the front or pressure surface may be flat. The single tow lines are attached to the pressure face adjacent the center point of such face in order to produce the desired shearing effect. In a similar manner it is possible, when towing the trawl net close to the surface, to increase the capacity of the trawl doors to rise in the water by applying extra floats or shearing boards having an upwardly directed shearing effect.

In the embodiment according to Figures 1 to 3, where the trawl net is towed at a certain distance below the surface of the sea, the depth is dependent on the effective length of the trawl warp, besides on the towing speed and on the setting of the trawl doors.

In Figures 4 to 6 is shown an embodiment which enables the trawl net to be moved at a definite height over the sea bottom independently of these factors. This last-mentioned embodiment differs from the one previously described only in the fact that the trawl doors are provided with dragging weights 21 which, by means of a wire 22 of variable length, are attached to the lower edge of the trawl door so that the trawl door is compelled to move at a constant distance from the sea bottom determined by the length of the wire 22. In this embodiment the trawl doors 15 should, as shown in Figure 6, be connected up in such a manner as to diverge downwardly, whereby a tendency to rise in the water is produced, the rising being limited by the length of the dragging weight wire 22.

In order that the trawl doors 15 shall have a stable motion through the water they are, both in the embodiment according to Figures 1 to 3 and in the embodiment according to Figures 4 to 6, inserted in the towing cables 14, 13 with the aid of two crown knots applied substantially at right angles to each other. A crown knot, as shown in the drawing, consists of a towing cable which is divided into two branches, the branches being attached at spaced points to the object being towed or to the object which is doing the towing. Preferably, as shown in these figures, that part 13 of the towing cable which is connected to the trawl net is secured by means of the two branches of its crown knot to the rear edge of the trawl door, whereas that part 14 of the towing cable, which is fastened to the boat, is secured by means of its crown knot branches to points on the horizontal line of symmetry of the trawl door.

To permit a variation of the angle of incidence and/or slope in a vertical direction of the trawl doors, the branches of the rear and the front crown knots should be individually shiftable at their points of attachment. Various arrangements for this purpose are shown in Figures 7 to 11.

In these figures the sweeping cable 13 is secured to the trawl door by means of a crown knot having two branches 25 and 26 of equal length, which are secured to the rear edge of the trawl door at the top and bottom of the latter. Inserted at the center of the crown knot between the sweeping cable 13 and the branches 25, 26 is a ring 27. The branches 25 and 26 are fastened to the ring in two spaced fixed points 28 and 29 whereas the sweeping cable 13 can be selectively secured to any one of a number of holes 30, uniformly spaced around the circumference of the ring, by means of a shackle or the like. If the sweeping cable 13 is secured in the hole 30 which is positioned equidistantly from each of the fixed fastening points 28 and 29 of the branches 25 and 26, as shown in Figure 7, an imaginary extension of the sweeping cable 13 will be coincident substantially with the horizontal axis of the trawl door 15, the trawl door then being biassed by the action of the ballast weight 31 to take up a vertical position in the water. If, on the other hand, the sweeping cable 13 is fastened in a hole 30 in the ring 27 positioned nearer to the fastening point 29 for the lower crown knot branch 26, as shown in Figure 10, the extension of the sweeping cable 13 will intersect the trawl door below the horizontal axis, thereby causing the trawl door to slope outwardly with respect to the vertical. If, instead, the sweeping cable 13 is secured to a hole 30 which is positioned nearer to the fastening point 28 of the upper crown knot branch 25, as shown in Figure 11, the trawl door will instead slope inwardly. By selecting a suitable hole 30 for the fastening of the sweeping cable in the ring 27 it is thus possible to select, in each particular case, the most suitable slope for the trawl door in the vertical plane.

Alternatively, it is possible to join the sweeping cable 13 directly to both branches 25 and 26 of the crown knot and effect the desired regulation by moving the fastening points of the branches along the rear edge of the trawl door. For this purpose the trawl door can be provided at the top and at the bottom with a row of holes or attachments, between which the free ends of the branches 25 and 26, which may be provided with shackles, can be moved.

For varying the angle of incidence of the trawl doors and thus also the effective lateral shearing of the doors, a securing arrangement for the trawl cable 14 of the kind shown in Figures 7 to 19 may be employed. The trawl cable 14 is secured to the trawl door 15 by means of a single crown knot, the branches 32 and 33 of which are attached to points on the pressure side of the trawl door positioned substantially on the horizontal axis of the trawl door. The front branch 32, which consists of a piece of chain, has a fixed fastening point 34, whereas the rear branch 33, which may also consist of a piece of chain, has a fastening point 35, which is displaceable substantially horizontally. To permit the displacement of the fastening point 35 there are provided, on the pressure side of the trawl door, two angle irons 36 which form between their projecting flanges a guide track for a coupling plate 37, to which the rear crown knot branch 33 is secured by means of a shackle 38. The trawl door 15 has a plane pressure surface and the coupling plate 37 is provided with a straight rear edge by means of which it contacts the trawl door.

Provided in the angle iron flanges at equally spaced points are a number of holes 39, while corresponding holes 40 are provided in the coupling plate 37 but spaced at somewhat smaller mutual distances, so that according to the principle for a nonius or vernier a very much greater number of positions for the coupling plate is obtainable than that corresponding to the number of holes. The coupling plate 37 is secured in set position by means of a locking pin 41 (Fig. 7), which is inserted through the coinciding holes in the angle irons and in the coupling plate.

The floating trawl doors 15 forming part of the trawl net according to the invention may be shaped in any suitable manner and have any suitable kind of profile. In the embodiment shown in Figures 7 to 11 the trawl door has the shape of a pair of aeroplane wings, having a substantially straight front edge and a rear edge which slopes towards the ends, and has a plane pressure surface and a streamline-shaped back surface. In the embodiment according to Figures 12 and 13 the trawl door consists of a rectangular iron plate of even thickness, curved so as to provide a circular-cylindrical pressure surface. Figure 14 shows the profile of a trawl door of wood having a circular-cylindrical pressure surface, whereas Figure 15 shows the profile of a trawl door of wood of even thickness but with a varying curvature of the pressure surface. According to Figure 16 a trawl door made in accordance with Figure 12 is provided at its upper edge with a float 42, and to its lower edge is connected, by means of a wire 43, a dragging weight 44.

Particularly for facilitating the setting out of the new fishing equipment, it may be suitable to shape the shoulder rods 11, provided at the front edge of the trawl net arms, in such a manner that they will obtain a shearing effect of their own, so that they will shear apart immediately on setting out, whereby the risk of the shoulder rods getting entangled in the trawl net 10 and tearing the latter will be reduced. Such an embodiment of the shoulder rods is shown in Figures 18 and 19. The shoulder rod 11 has a plane pressure surface and a streamline-shaped convex back surface, and it is provided at each end with two fastening rings 45 and 46 which are so positioned that the shoulder rod, when a pull is exerted in said rings, automatically takes up an oblique position with respect to the direction of towing.

The invention is, of course, not limited to the embodiments illustrated on the drawings and described in detail above, but various modifications are conceivable within the scope of the invention.

I claim:

1. A single-boat trawling apparatus comprising in combination a conical shaped net body, a head rope at the upper edge of the mouth of said net body, a foot rope at the lower edge of the mouth of the net body, a shoulder rod at either side of the net for holding the ends of the head and foot ropes spaced apart, a pair of towing cables attached to each of said shoulder rods, a pair of floating trawl doors connected to the towing cables so as to have a lateral shearing effect, a plurality of self-stablizing shearing boards having an upwardly directed shearing effect attached to the head-rope at a plurality of spaced points along the length of the rope each by means of a single cord, and a plurality of self-stabilizing shearing boards having a downwardly directed shearing effect in the same manner attached to the foot-rope at spaced points along the length thereof, the said single cords attached to the shearing boards at spaced points along the head-rope and foot rope being attached to the pressure faces of the shearing boards adjacent the center points of said boards, whereby the mouth of the net assumes an open shape.

2. The trawling apparatus of claim 1 wherein said floating trawl doors are connected to the cables by means of leading and trailing crown knots, two branches of each of said crown knots being attached to the trawl doors and being disposed at an angle to each other, in such manner that lateral shearing effects are produced by the trawl doors.

3. The trawling apparatus of claim 2 wherein the trailing crown knots are secured to the rear edges of the trawl doors at spaced points while the leading crown knots are secured to the trawl doors at spaced points along the horizontal axes of the doors.

4. The trawling apparatus of claim 1 wherein the said floating trawl doors are connected to the towing cables by means of leading and trailing crown knots, each of said trailing crown knots comprising a ring forming the center point of the knot provided with a plurality of circumferentially spaced holes, two branches of said crown knots being connected between spaced points on the rear vertical edge of its trawl door and two of the spaced holes in said ring while the third branch is connected to one of said shoulder rods and to a third hole in said ring, whereby the slopes towards the vertical of the trawl doors are adjustable by shifting the points of attachment of the branches of the crown knots to said rings.

5. The trawling apparatus of claim 1 wherein the said floating trawl doors are connected to the towing cables by means of leading and trailing crown knots, said trawl doors being provided with a plurality of vertically spaced attachments arranged along their rear vertical edges, the branches of the trailing crown knots being attached to said attachments at spaced points.

6. The trawling apparatus of claim 1 wherein the said floating trawl doors are connected to the towing cables by means of leading and trailing crown knots, flanges provided with equally spaced holes secured to the pressure faces of said trawl doors along their horizontal axes, coupling plates provided with similar holes spaced apart equally but at a slightly different distance, locking pins for adjustably connecting the coupling plates to the flanges by passing through registering holes in the plates and flanges, the holes in the plates and flanges being spaced in accordance with the principle of a nonius, whereby the coupling plates can be closely fixed in a predetermined position with respect to the flanges, one of the branches of each of the leading crown knots being secured to said coupling plates, while a second branch is attached to the leading edges of said trawl doors substantially along the horizontal axes of said doors.

7. The trawling apparatus of claim 1 wherein said shoulder rods are provided with streamlined convex back surfaces and plane pressure surfaces and are connected to exert lateral shearing effects on the net.

KARL-HUGO LARSSON.

References Cited in the file of this patent

UNITED STATES PATENTS

| Number | Name | Date |
|---|---|---|
| 1,081,837 | Jordan | Dec. 16, 1913 |
| 1,381,265 | Anderson | June 14, 1921 |
| 1,393,907 | Reimer | Oct. 18, 1921 |
| 1,575,879 | Vigneron | Mar. 9, 1926 |
| 2,062,718 | Kallberg | Dec. 1, 1936 |
| 2,137,663 | Aspenburg | Nov. 22, 1938 |
| 2,363,668 | Groen | Nov. 28, 1944 |

FOREIGN PATENTS

| Number | Country | Date |
|---|---|---|
| 57,563 | Norway | Feb. 1, 1937 |
| 223,305 | Great Britain | Oct. 20, 1924 |
| 238,282 | Great Britain | Aug. 10, 1925 |
| 259,913 | Great Britain | July 21, 1927 |
| 561,347 | France | Oct. 19, 1923 |